Nov. 8, 1938.   W. S. BRINK   2,135,482
WHEEL AND TIRE RIM STRUCTURE
Filed July 8, 1936

INVENTOR
Winfield S. Brink
BY Albert L. Ely
ATTORNEY

Patented Nov. 8, 1938

2,135,482

UNITED STATES PATENT OFFICE 2,135,482

WHEEL AND TIRE RIM STRUCTURE

Winfield S. Brink, Akron, Ohio, assignor to The Firestone Steel Products Company, Akron, Ohio, a corporation of Ohio Application July 8, 1936, Serial No. 89,511

1 Claim. (Cl. 301—20)

This invention relates to wheel and tire rim structures, and more especially it relates to wheels comprising metal fixed rims or felloes having rims for pneumatic tires detachably mounted thereon.

The chief objects of the invention are to provide a structure of the character mentioned comprising a plurality of tire rims of various widths that are mountable alternatively upon the fixed rim of a wheel; to provide pneumatic tire rims of various widths and same diameter with portions of uniform width for engagement with attaching means for securing them to a wheel; and to provide means for removably mounting tire rims of the character mentioned upon the metal felloe of a wheel, which securing means are entirely removable so as to permit the wheel to run on the metal felloe without the tire. Other objects will be manifest.

Figure 1:
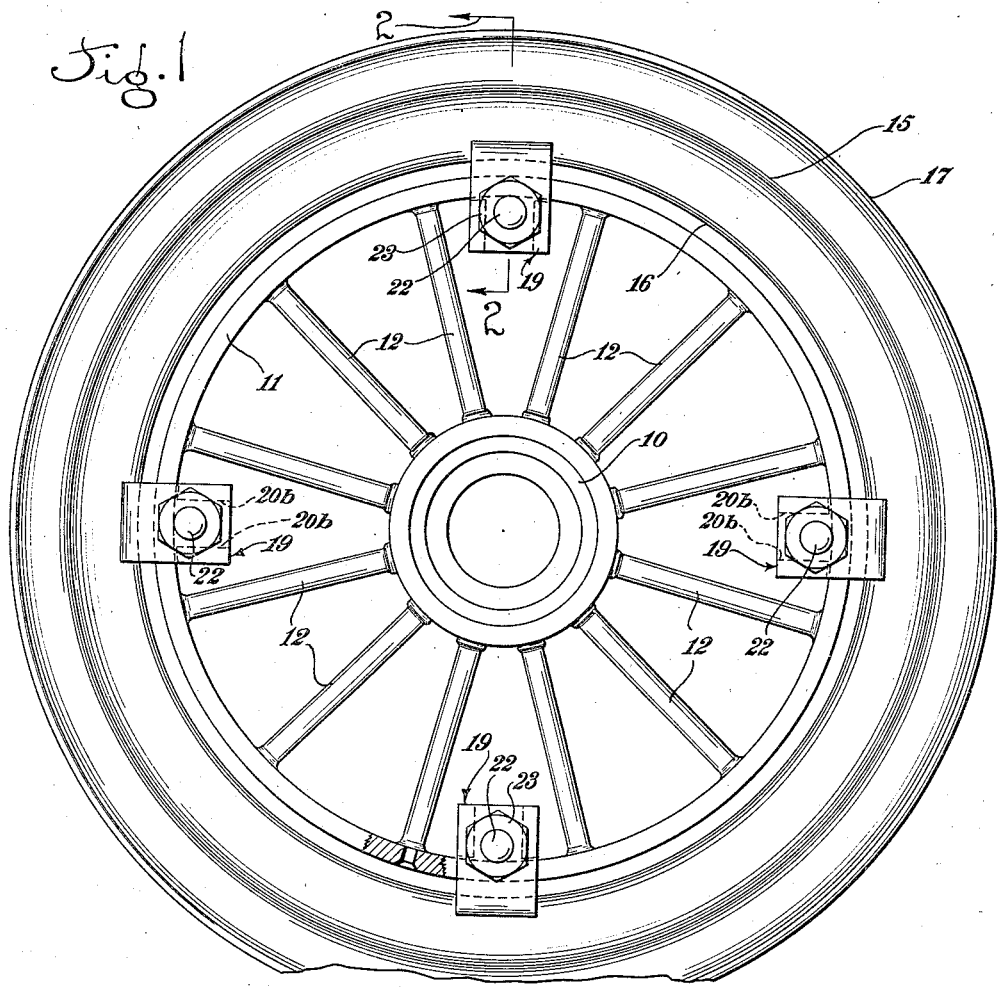
Figure 2:
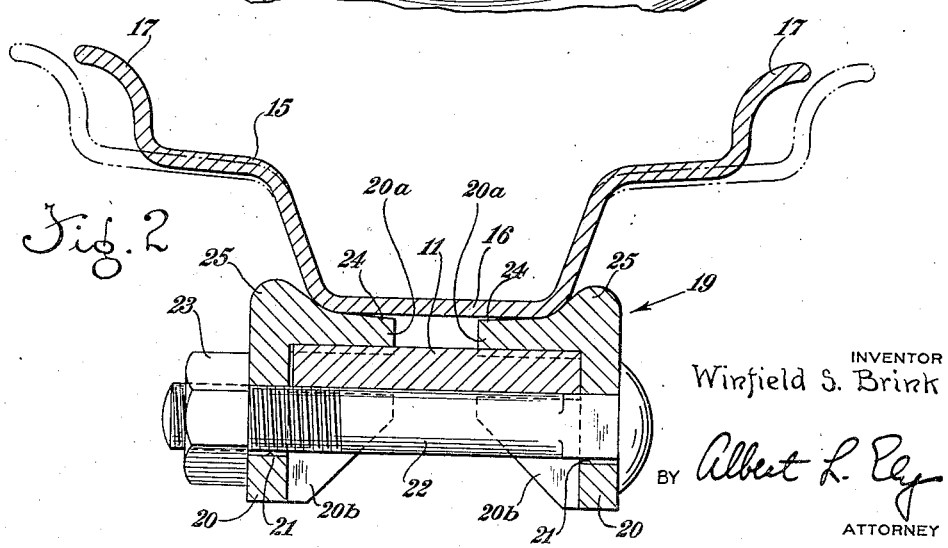

Of the accompanying drawing:

Figure 1 is a side elevation of a wheel and rim structure embodying the invention, in its preferred form, a part being broken away; and Figure 2 is a section on the line 2—2 of Figure 1.

Referring to the drawing, there is shown in Figure 1 an all metal wheel consisting of a hub 10, a fixed rim or felloe 11, and spokes 12, 12 fixedly connected to said hub and felloe. Preferably the outer ends of the spokes 12 are flush or substantially flush with the outer periphery of the felloe 11 so that the wheel may run on the latter as a tire if desired. This type of wheel is commonly used on numerous farm vehicles, and the maximum advantages of this invention are achieved when all such wheels in use by any farmer are of the same outside diameter and width.

At 15 is shown one of a series of pneumatic tire rims that is mountable upon the felloe 11. Said rim is of the drop center type having a central circumferential well 16 that is of uniform depth and width in all the rims of the series. The rim also is formed with the usual lateral flanges 17, 17 that engage the bead portions of a pneumatic tire mounted on the rim. The distance between flanges 17 will vary in different sets of rims according to the different widths of tires to be mounted thereon, the positions of the flanges of an alternative tire rim being indicated in broken lines in Figure 2. The inside diameter of the well 16 of the tire rim 15 is somewhat larger than the outside diameter of the metal felloe 11 so the rim may pass easily over the felloe, and providing space therebetween for the devices that secure the rim to the felloe.

Said rim securing devices, generally designated 19 are uniformly spaced circumferentially of the rim, and are herein shown as four in number although a greater number will be required on wheels of larger size. As is most clearly shown in Figure 2 each of the said devices comprises a pair of jaw-like clips 20, 20 that are substantially identical, each consisting of a unitary structure comprising a portion 20a that overlies the felloe 11 and a pair of spaced-apart portions 20b underlying the felloe. That portion of each clamp 20 that is disposed laterally of a margin of the felloe is apertured at 21 to receive a carriage bolt 22 that extends through both clamps, between portions 20b thereof and below the felloe 11, said bolt being provided with a nut 23 by which the clamps are drawn toward each other. One of the apertures 21 is square so as to engage the shank of the carriage bolt 22 to prevent it from turning. Portion 20a of each clamp 20 is disposed between the well 16 of rim 15 and the metal felloe 11, and has its outwardly directed face tapered or sloped toward its inner end as shown at 24 for wedging engagement with said rim-well. At its outer end the tapered surface 24 of clamp portion 20a merges with a shoulder 25, the latter abutting one of the corners of the rim-well.

The arrangement is such that the tire rim 15 is securely retained upon the felloe 11 of the wheel, yet is easily and quickly removable therefrom. The rim-retaining devices 19 also are easily removable from the felloe 11, and when removed there is nothing projecting from the felloe to prevent the wheel from running thereon.

Modification may be resorted to without departing from the spirit of the invention or the scope of the appended claim.

What is claimed is:

A wheel structure comprising an all metal fixed felloe, a tire rim mounted thereon in spaced relation thereto, and a plurality of devices removable from the felloe for securing the tire rim thereon, each of said devices comprising a pair of clamp members and a bolt engaging each for drawing them toward each other, each clamp member having an outer leg provided with an outer wedging surface disposed between the felloe and tire rim and a portion engaging the inner circumference of the felloe, said bolt being positioned within the inner circumference of the felloe.

WINFIELD S. BRINK.